United States Patent [19]
Degady et al.

[11] Patent Number: 5,944,266
[45] Date of Patent: Aug. 31, 1999

[54] ELASTOMER PROCESSING APPARATUS AND SYSTEM FOR CHEWING GUM

[76] Inventors: Marc Degady, 91 Patriots Rd., Morris Plains, N.J. 07950; James A. Duggan, 514 Otto Rd., Machesney Park, Ill. 61115; Kevin R. Tebrinke, 5 Ridgewood Dr., Fort Madison, Iowa 52627; Joseph Bunkers, 8767 Carradale, Caledonia, Ill. 61011; Arthur W. Upmann, 13819 Cassidy Dr., Rockton, Ill. 61072

[21] Appl. No.: 09/089,121

[22] Filed: Jun. 2, 1998

Related U.S. Application Data

[63] Continuation of application No. 08/725,360, Oct. 3, 1996, Pat. No. 5,792,495.

[51] Int. Cl.⁶ .................................................. B02C 19/12
[52] U.S. Cl. .............................. 241/60; 241/73; 241/81; 241/65
[58] Field of Search ........................... 426/3, 5; 241/235, 241/65, 73, 60, 224

[56] References Cited

U.S. PATENT DOCUMENTS

| | | |
|---|---|---|
| 2,290,120 | 7/1942 | Thomas . |
| 3,262,784 | 7/1966 | Bucher . |
| 4,000,321 | 12/1976 | Mochizuki . |
| 4,139,589 | 2/1979 | Beringer . |
| 4,161,544 | 7/1979 | Kaul . |
| 4,370,350 | 1/1983 | Fisher . |
| 4,493,849 | 1/1985 | Carroll . |
| 4,555,407 | 11/1985 | Kramer . |
| 4,740,376 | 4/1988 | Yang . |
| 4,753,805 | 6/1988 | Cherukuri . |
| 4,803,082 | 2/1989 | Cherukuri . |
| 4,816,265 | 3/1989 | Cherukuri . |
| 4,850,842 | 7/1989 | Van Alstine . |
| 4,882,172 | 11/1989 | Van Alstine . |
| 4,931,293 | 6/1990 | Cherukuri . |
| 4,940,594 | 7/1990 | Van Alstine . |
| 5,045,325 | 9/1991 | Lesko . |
| 5,124,160 | 6/1992 | Zibell . |
| 5,135,760 | 8/1992 | Degady . |
| 5,229,148 | 7/1993 | Copper . |
| 5,248,228 | 9/1993 | Giardina . |
| 5,324,530 | 6/1994 | Kehoe . |
| 5,397,580 | 3/1995 | Song . |
| 5,419,919 | 5/1995 | Song . |
| 5,443,854 | 8/1995 | Cummins . |
| 5,486,366 | 1/1996 | Song . |
| 5,523,097 | 6/1996 | Song . |
| 5,562,936 | 10/1996 | Song . |
| 5,567,450 | 10/1996 | Zuromski . |
| 5,571,543 | 11/1996 | Song . |

*Primary Examiner*—Joseph J. Hail, III
*Assistant Examiner*—Dermott J. Cooke

[57] ABSTRACT

An apparatus and system for processing the elastomeric component of a gum base or chewing gum product. Bulk blocks or slabs of elastomeric materials are conveyed to a housing with a rotary cutting mechanism. A feeding and metering mechanism controls the introduction of the blocks or slabs to the cutting mechanism. A lubricant feeding mechanism controls the introduction of lubricant to the housing for coating and lubricating the elastomeric materials. A cooling mechanism maintains the temperature of the housing and materials within a prespecified range. A screen or filtering mechanism controls the size of the ground-up pieces of material which are removed from the housing. Vacuum-conveyer systems convey the ground-up pieces of material to a storage hopper where excess lubricant is removed and then to a metering mechanism for selective introduction of the pieces of material to an extruder mechanism and/or gum or gum base manufacturing process.

15 Claims, 2 Drawing Sheets

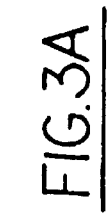
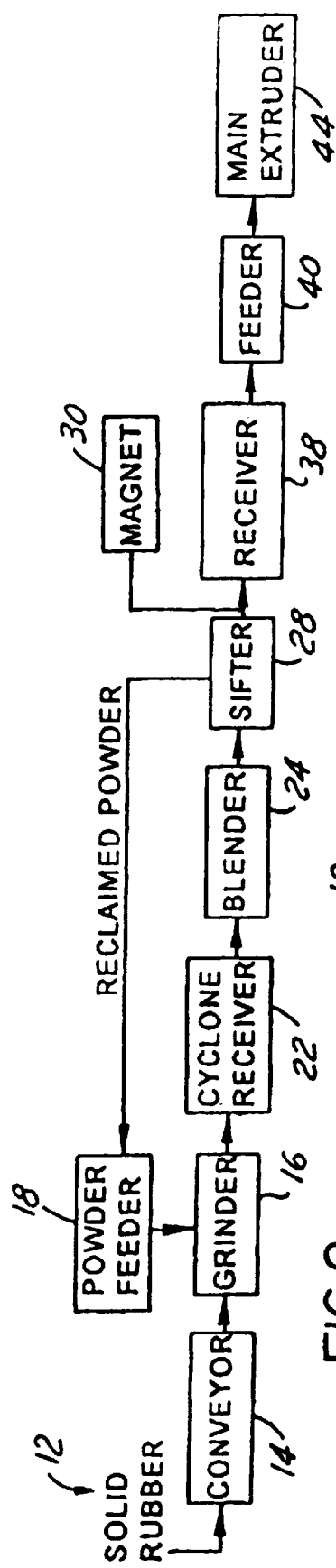
FIG.2
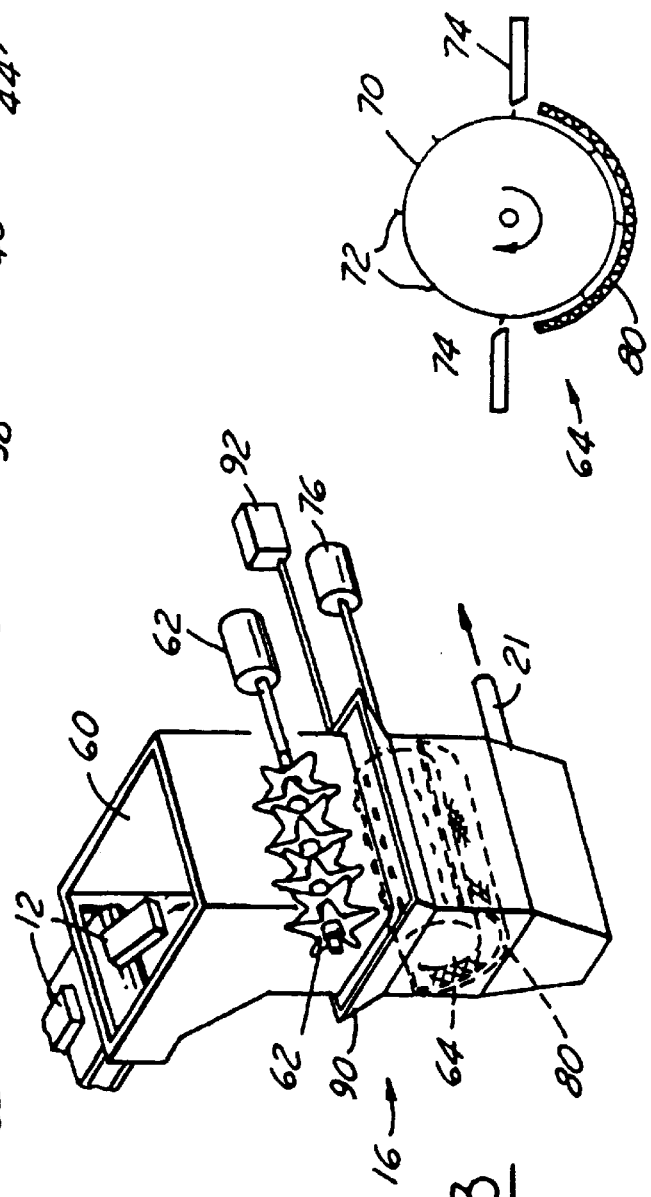
FIG.3
FIG.3A

ELASTOMER PROCESSING APPARATUS AND SYSTEM FOR CHEWING GUM

CROSS-REFERENCE TO RELATED MATTERS

This is a continuation of application Ser. No. 08/725,360, filed on Oct. 3, 1996, now U.S. Pat. No. 5,792,495, which issued on Aug. 11, 1998.

TECHNICAL FIELD

The invention is directed to an apparatus and method for the processing of elastomers for chewing gum and chewing gum bases.

BACKGROUND OF THE INVENTION

Elastomers are one of the principal ingredients of a chewing gum base and thus in turn one of the principal ingredients of a final chewing gum product. the final chewing gum, although there are some systems which are capable of producing a final chewing gum product in one continuous process.

A typical chewing gum base includes one or more elastomers, one or more fillers, one or more elastomer solvents, plasticizers and, optionally, polymers, waxes, emulsifiers and miscellaneous colors, flavors, sweeteners, acids and anti-oxidants. Due primarily to the difficulty in melting and dispersing the elastomers homogeneously among the other gum base ingredients, gum base manufacture has typically been a tedious and time-consuming batch process. Sigma blade batch mixers are typically used for this conventional process.

In general, a chewing gum composition typically comprises a water-soluble bulk portion, a water-insoluble chewing gum base portion, and typically water-insoluble flavoring agents. The insoluble gum base generally comprises elastomers, elastomer solvents, plasticizers, waxes, emulsifiers, resins, fats and inorganic fillers. The water-soluble portion dissipates with a portion of the flavoring agent over a period of time during chewing. The gum base portion is retained in the mouth throughout the time that the product is chewed.

The batch method of producing chewing gums has long been considered the standard for producing chewing gums, as well as gum bases, on a commercial scale. The batch processes tend to be labor-intensive and produce chewing gums of varying consistency. Once the gum base is formed, emulsifiers, such as lecithin, softeners, such as glycerin or Wesson oil, corn syrup and bulking agents, such as sugars or sugar alcohols, are added to the molten mass. Later, flavorings, such as flavor oils and/or spray-dried flavors, and sweeteners (and/or acids) are added while mixing is continued until a homogeneous mass is achieved. The chewing gum mass is then cooled and later rolled, scored, and wrapped into the final product.

Where the gum base is processed separately, typically the molten gum base batch after mixing is emptied into coated or lined pans, or pumped to other equipment such as holding tanks or a filling device, then extruded or cast into shapes, and allowed to cool and solidify, before being ready for use in chewing gum.

Various efforts have been undertaken to try to simplify and reduce the time required for gum base and chewing gum manufacture, as well as to prepare gum base and gum products which have improved commercially acceptable properties. For example, the use of continuous extruders to make a final chewing gum product are shown in U.S. Pat. No. 5,135,760 to Degady et al., U.S. Pat. No. 5,045,325 to Lesko et al., and U.S. Pat. No. 4,555,407 to Kramer et al.

Also, there are several processes in the art for continuously producing a chewing gum base with the use of a continuous extrusion machine. These are disclosed, for example, in U.S. Pat. No. 5,419,919 to Song et al., and U.S. Pat. No. 5,486,366 to Song et al.

The continuous gum base processes and final chewing gum product processes disclosed in these patents typically utilize a continuous extrusion machine, such as a twin-screw extruder. These extruders can be co-rotational, counter-rotational, intermeshing or tangential twin screw extruders, depending on the requirements and purposes of the system involved. Those extruders typically have several feed inlets where the ingredients are added separately. Continuous extrusion machines which can be used for producing a chewing gum base or a final chewing gum product, or both, include extruders from Japan Steel Works, Leistriztz, Werner & Pfleiderer Corp., Buss Mfg. Co., WLS, Togum and Baker Perkins.

Elongated screws inside the barrels of the extruders are equipped with different types of elements. While different equipment manufacturers make different types of screw elements, the most common types include conveying elements, compression elements, reverse conveyance elements, homogenizing elements such as shearing disks and toothed elements, and kneading disks and kneading blocks. These various types of elements, and other elements typically used in extruding machines, especially twin screw extruders, are well known in the art and commercially available. The elements are often specifically designed for the particular type of extruders utilized. Elements intended for similar functions will vary in design depending on the type of extruder for which they are intended.

Whether a batch-type processor or a continuous extruder-type processor is used to produce the chewing gum and gum base products, it is important to provide the various ingredients for these products in the best form and condition. This improves the speed and efficiency of the final processing. In this regard, ingredients such as the fillers, elastomers, plasticizers, oils, waxes, and the like, often require special handling or preparation prior to being included in the batch or extrusion process.

Preparation of the ingredients is especially important where continuous extrusion processing is utilized. The ingredients supplied to the continuous extrusion apparatus are preferably provided in the optimum size, shape, and temperature for ease of handling, insertion and intermixing with the other ingredients in the extruder. Also, due to the properties of some of the various ingredient materials, it is necessary to pre-prepare or pre-blend them in order to allow them to be inserted in the extruder in the best possible condition.

As indicated, one important component of a gum base is the elastomeric portion which can include natural elastomers, synthetic elastomers, or combinations thereof. This element of the gum base is important in that it provides the insoluble body with resiliency to recover from deformation caused by chewing. In preparing gum base, it is important that other components which are included in the base composition to effect various characteristics of the resulting chewing gum, be thoroughly mixed with the elastomeric portion so that the entire gum base product will retain proper resiliency as a homogeneous phase.

Solid elastomers suitable for use in chewing gum bases and final chewing gum products include synthetic gums or elastomers, such as butadiene-styrene copolymer, polyisobutylene, and isobutylene-isoprene copolymer, as well as natural gums or elastomers, such as chicle, natural rubber, jelutong, balatea, guttapercha, lechi, caspi, sorva, or mixtures thereof.

In order to achieve a ho mogeneous phase gum base body wherein a proper resiliency is constant throughout and the product is free from lumps and other irregularities, it is necessary to provide components which are compatible with one another and as dispersed and distributed as much as possible in the materials being processed. Factors such as the affect of water-soluble components, heat, moisture, and the like, must be considered in preparing a useable gum base.

It is the general object of the present invention to provide an improved method and apparatus for the production of chewing gum products and gum base products. It is also an object of the present invention to provide improved apparatus and methods for preparation of some of the chewing gum and gum base ingredients prior to blending in order to facilitate improved final processing.

It is still another object of the present invention to provide a method and apparatus for improving the properties of elastomeric ingredients for chewing gum bases. It is another object of the present invention to provide an improved process and apparatus for breaking down, preparing, and inserting the elastomeric component of a chewing gum base into the system, particularly for use with a continuous extrusion process.

These and other objects, benefits, and advantages of the present invention are met by the following description of the invention.

SUMMARY OF THE INVENTION

The present invention provides an improved apparatus and process for producing a gum base and the final chewing gum product. A novel process and apparatus are used to grind and break down the elastomeric ingredient of the gum base product, coat the individual pieces with an applicable powder or filler, and insert the elastomeric pieces into a gum base processing system. In this regard, where a continuous extrusion machine is utilized, the elastomeric material can be inserted directly into the barrel of the extrusion machine during the operation of a continuous, steady-state, gum base extrusion process.

In accordance with the present invention, a solid slab of the elastomeric or rubber material is fed into a cutting and grinding mechanism where it is cut or broken up into small pieces or flakes and lightly coated with a powder or filler material. The material is lubricated with the powder to prevent it from massing or sticking together. The rubber blocks are deposited in the chute of a grinding machine by a conveyor system. A feeder wheel (a/k/a star feeder) is used in the inlet chute to regulate the addition of the elastomeric material into the grinder. A rotary cutter is used in the grinding machine to cut and break-up the elastomeric material. A cooling jacket is used around the rotary cutter section to regulate the temperature. The small pieces or flakes of rubber material are lightly coated with the powder and conveyed by vacuum into a cyclone receiver. The material is fed into a cooled blender which holds and cools it. The material subsequently passes from the blender on demand through a sifter where excess powder is reclaimed and returned for later use with other elastomeric material.

One or more metal detectors and magnet protectors are used to separate metallic impurities from the elastomeric material.

The material is vacuum-conveyed from the sifter to a feeding system for passage into the main extruder. It is passed through another cyclone receiver and into a loss-in-weight feeder. The feeder in turn is programmed to insert an appropriate amount of the coated elastomeric flakes into a feeding port in the extrusion machine.

BRIEF DESCRIPTION OF THE DRAWINGS

FIG. 2 is a flow diagram of an elastomeric processing system in accordance with the present invention; and FIGS. 3 and 3A illustrate a preferred grinding and cutting mechanism in accordance with the present invention.

BEST MODE(S) OF PRACTICING THE INVENTION

Figure 1:
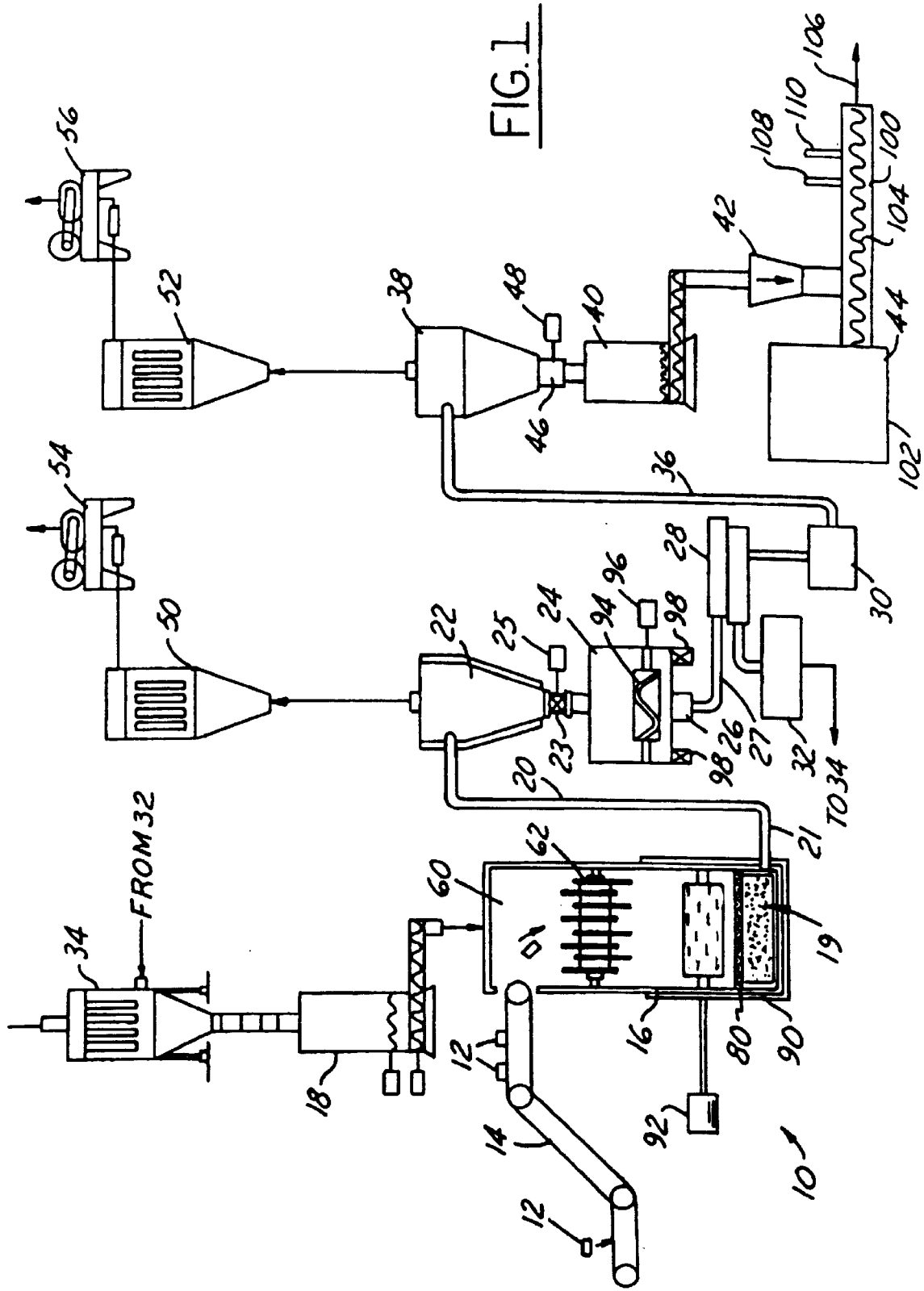
FIG. 1 is a schematic diagram of the elastomeric processing system in accordance with the present invention.

The present invention is particularly suitable for processing elastomeric products, particularly rubber products, which are used in chewing gum bases and the final chewing gum products. In general, the present invention provides an apparatus and method for cutting or breaking up the rubber components in order to facilitate their use in a chewing gum base or chewing gum product. In this regard, it is to be understood that the present invention can be used for preparing the elastomeric/rubber component of either a chewing gum base or a final chewing gum product and can be used with either a batch-type system or a continuous extruder-type system.

In the preferred embodiment of the present invention, and for ease in illustrating the present invention, the present invention is described herein with reference to its use in a continuous gum base manufacturing system. In particular, for use with a continuous gum base process, the present invention facilitates the use and insertion of the elastomeric component of the gum base with the other ingredients and components of the system.

A schematic illustration of the apparatus and system of the present invention is illustrated in FIG. 1 and referred to by the reference numeral 10. A flow chart illustrating the basic processing steps of the present invention is shown in FIG. 2. A preferred cutting and grinding mechanism is shown in FIGS. 3 and 3A.

In general, the solid elastomeric (rubber) blocks or slabs 12 are inserted by a conveyor 14 into a grinding apparatus 16 where they are ground into small flakes or particles. A feeder 18, which preferably is a loss-in-weight (LIW) feeder, is used to add powder or filler to the grinding operation in order to lightly coat and lubricate the particles.

The coated flakes or small particles 19 of rubber are conveyed by a vacuum-conveying system 20 into a cyclone receiver 22 where the particles in turn are introduced into a cooled ribbon blender 24. A rotary valve 23 operated by computer controlled motor 25 is used to regulate the flow of material from the receiver 22 to the blender 24. The receiver 22 is also cooled by, for example, a water jacket, in order to control the temperature of the elastomeric particles.

The particles are conveyed by gravity from the blender into and through a sifter 28 and a metal detector 30. Valve 26 regulates the flow of material into the conveyance conduit 27. Powder or filler which is removed from the particles in the sifter 28 is collected in a storage container 32. The reclaimed powder is subsequently returned to a hopper 34 for the powder feeder 18 for later re-use in the process.

The particles which pass through the sifter 28 and metal detector 30 are then conveyed by a vacuum-conveying system 36 into a second cyclone receiver 38. The ground-up and coated elastomeric material in the receiver 38 is introduced into the feeding system for the continuous chewing gum base process. In this regard, material is introduced into a loss-in-weight feeder 40 which is controlled to allow insertion of an appropriate volume of material into the feeding chute 42 of the main extruder 44. A standard valve gate 46 controlled by motor/activator 48 is used to dump a batch of material from the receiver 38 into the LIW feeder 40.

Preferably, at least one metal detection and magnet protecting device 30 is used to remove impurities from the flow of elastomeric material. In this regard, although only one metal detector 30 is shown in FIG. 1, it is understood that several metal detectors can be used in the system. Other detectors could be positioned, for example, as part of the vacuum-conveyor system 20, or the valve gate 46.

Exhaust air from conveyor/cyclone receiver systems 20/22 and 36/38 is cleaned and removed from the systems by filter receivers 50 and 52, respectively. The air passing through the filter receivers 50 and 52 is exhausted to the atmosphere by blower mechanisms 54 and 56, respectively.

In accordance with the present invention, the solid elastomer is subjected to high intensity and high shear grinding in order to masticate it and break it up into small flakes or particles for use in the gum making process. This allows the final chewing gum base product to have a more uniform consistency and be free from lumps and other irregularities. The more uniform the elastomeric or rubber particles before they are added to the extruder, the more uniform and homogeneous the final product will be.

Preferably, the elastomer is broken and cut up into pieces on the order of 0.03 to 0.50 inches in diameter, and preferably 0.125 to 0.25 inches. In this regard, it is preferred that the elastomeric material not be fed into the extruder in a fine powder or in large chucks.

Solid elastomers suitable for use in the process of the present invention are those normally used in chewing gum bases, and include synthetic gums or elastomers, such as butadiene-styrene copolymer, polyisobutylene, and isobutylene-isoprene copolymer, natural gums or elastomers such as chicle, natural rubber, jelutong, balatea, guttapercha, lechi, caspi, sorva, or mixtures thereof. Among these, butadiene-styrene copolymer, polyisobutylene, isobutylene-isoprene copolymer, or mixtures thereof are preferred as a solid elastomer.

The filler or powder component for the present invention may be a calcium carbonate, magnesium carbonate, talc, dicalcium phosphate, or the like. Preferably, the powder/filler is atomite, talc or dicalcium phosphate.

The details of the grinding apparatus 16 are better shown in FIGS. 3 and 3A. The grinding apparatus 16 includes an inlet chute 60, one or more feeding mechanisms 62, such as a star-feeder, and a grinding and cutting mechanism 64. The star-feeder 62 is used to slow down and regulate the feeding of the elastomeric blocks 12 into the grinding and cutting mechanism 64. The star-feeder is controlled and driven by a motor and control mechanism 66. In this regard, although only one star-feeding mechanism 62 is shown for the preferred embodiment, it is understood that two or more star-feeders could be utilized, and also that other conventional material feeding and regulating mechanisms could be utilized.

The grinding and cutting mechanism 64 includes a rotary cutter 70 which has one or more knife blade cutting edges 72 on a rotating cylinder and one or more stationary knife edges 74 on the housing. In this regard, the preferred rotary cutter is a Mitts & Merrill "knife-hog" from Reduction Technology, Inc., Leeds, Ala. It is understood, of course, that other rotary cutting mechanisms could be used, such as those available from Fitzpatrick, so long as they meet the purposes and objects of the present invention. The rotary cutting mechanism 64 is controlled by a motor and control system 76 and slices, carves and cuts the bales or blocks of elastomeric material into small flakes or particles.

A screen or grate member 80 is positioned adjacent the grinding and cutting mechanism 64. The grate is positioned immediately below the lower half of the rotary cutter 70 and contoured to rub against and/or hold larger particles in place so they can be carved or sliced further by the cutting edges 72. The rolling of particles against the grate helps "chew-up" the particles into smaller pieces. The openings in the grate meter the particles such that only particles and flakes of a predetermined size are allowed to pass through it. Air flow within the grinding apparatus 16, as well as a cooled environment, prevents the grate 80 from clogging.

The rubber flakes or particles which fall through the grate 80 are conveyed through conduit 21 of the vacuum conveying system 20. As an alternate embodiment, it is also possible to utilize an auger-type feeding or conveying apparatus to assist in the removal of the grates and pieces of elastomeric material from the grinding apparatus 16.

A water cooling jacket 90 is positioned around the grinding and cutting portion of the grinding apparatus 16. The cooling jacket 90 is cooled by a conventional water cooling system 92. With system 92, cooling water is circulated through the cooling jacket 90 and then returned for subsequent discharge.

The conveyor 14 can be of any conventional system. Typically, the elastomeric or rubber blocks 12 are 40–90 pounds or more in weight and need to be transported in some manner to the top of the inlet chute 60 of the grinding apparatus 16. A conveyor mechanism 14, as shown in FIG. 1, is a convenient and preferred mechanism for transporting the rubber slabs or blocks from the factory floor to a position for insertion into the grinding mechanism. Of course, it is understood in accordance with the present invention, that other conveying or transporting systems could be used to facilitate the insertion of the slabs or blocks into the grinding mechanism.

The powder feeder 18 also can be of any conventional type, but preferably is a single screw volumetric-type LIW feeder. A fine powder or filler, such as atomite, talc or dicalcium phosphate, is inserted through the volumetric feeder 18 in a controlled manner into the grinding apparatus 16 along with the slabs or blocks 12 of the elastomeric or rubber material.

The powder is used to coat the elastomer material as it is broken up by the grinding and cutting mechanism 64 so that the individual pieces do not mass or stick together. The powder also absorbs excess heat build-up and thus prevents the elastomer from becoming too soft and unprocessable. The cooling jacket 90 surrounding the cutting and grinding section of the grinding apparatus also keeps the temperature in the cutting section within a certain range which also helps prevent the rubber particles from sticking or binding together. In this regard, the combination of the speed of the cutting member 70, the low temperature in the cutting and grinding section, the metered feeding of the material into the cutting and grinding section, the coating of the rubber with filler, and the quick removal of the material by a vacuum-conveying system, allows the elastomeric material to be introduced into a batch or continuous gum base manufacturers process in an optimum condition.

With a conventional control system for the grinding and cutting mechanism, the elastomeric material can be fed into the rotary cutter at a preselected and adjustable rate and the material can be cut to a preselected size based on the speed of the cutter and the feed rate. Preferably, a high speed rotary cutter mechanism is capable of producing approximately 300–350 pounds per hour of elastomeric material. Also, the portions of the grinding apparatus 16 which come into contact with the elastomeric material are preferably made of stainless steel.

As indicated above, the coated elastomeric particles 19 which pass through the grate member 80 are conveyed by vacuum conveying system 20 to cyclone receiver 22. The receiver cyclone 22 is preferably made of stainless steel and is water jacketed for cooling, in a conventional manner.

The material in the receiver 22 is introduced in a controlled manner into the blender 24 by the rotary valve 23. The blender 24 has a spiral-shaped ribbon blender or auger member 94 which is operated and controlled by a motor and control mechanism 96. The blender 24 is also water-cooled by an appropriate water circulation system and cooling jacket (not shown). The blender 24 is positioned on load cells 98 which measure the weight of material in the blender unit. When it is desired to transfer an amount or batch of elastomeric material to the extruder 44 (i.e. when the amount of material in hopper 38 and LIW feeder 40 falls below a preset level), a signal is sent to valve 26 on the blender 24 and a certain amount of material in the blender is released into the sifter 28 for transfer by conveying system 36 into hopper 38 and subsequently into the extruder.

The sifter 28 can be of any conventional design. In the sifter, excess powder/filler material is removed from the rubber particles and flakes. The excess material is reclaimed by a reclaiming mechanism 32 for subsequent reuse in the powder feeder 18. The elastomeric particles are transferred by conveying system 36 into hopper-receiver 38.

As indicated above, the present inventive system includes a metal detector to remove metallic impurities from the elastomer particles. A metal detector 30 is preferably positioned adjacent the sifter discharge 28 in order to remove any metallic or magnetic particles which may exist in the elastomeric material.

Volumetric feeders, such as loss-in-weight feeder 40, are well known in the chewing gum processing field. These feeders meter appropriate amounts of dry or powder material into the chewing gum or chewing gum base apparatus (such as an extruder 44 or Sigma batch kettle (not shown)) for inclusion with other ingredients which also are metered into the system.

A continuous extrusion machine or mechanism 44 is shown in FIG. 1. The extruder includes a barrel 100 and a motor and control system 102. A screw-type feeding mechanism 104 is positioned in the barrel and operated by the motor. The final gum base product 106 is discharged at the end of the extruder.

As shown in FIG. 1, the elastomeric particles and flakes are inserted into inlet chute 42 and thus in turn into the hollow interior of the barrel 100. Other ingredients of the gum base material, which can be liquids or solids, are inserted downstream of the elastomeric material through inlet ports 108 and 110.

The extrusion machine 44 can be any one of a number of conventionally available extrusion machines for continuously producing chewing gum base or the ultimate chewing gum product. Such extruders are available, for example, from Japan Steel Works, Leistriztz, Werner & Pfleiderer Corp., Buss Mfg. Co., WLS, Togum and Baker Perkins. The extruders which can be used with the present invention are preferably co-rotating twin-screw extrusion machines. In accordance with the present invention, however, other types of extruders with other types of screw mechanisms could also be utilized.

Preferably, the hopper receivers, blender and sifter are made of stainless steel material for ease of cleaning and sanitizing. Other parts of the system which come in contact with the elastomeric material also preferably are made of stainless steel.

With the present invention, the elastomeric material for use in producing a gum base or chewing gum product is processed and handled in a quick and efficient manner. The elastomeric material is ground up into small pieces and flakes of a certain size in order to be utilized more effectively and efficiently in the chewing gum base or final gum manufacturing process.

The temperature of the entire elastomeric process 10 is also controlled to keep it within the pre-specified range. This assists in preventing the elastomeric material from heating up and thus becoming tacky and massing together. This allows the particles to be introduced into the extruder 44 in a more efficient manner for processing, and this results in a final gum base or chewing gum product which is more consistent, homogeneous, and free from lumps and other irregularities.

While there have been described what are presently believed to be the preferred embodiments of the invention, those skilled in the art will realize that changes and modifications may be made thereto without departing from the spirit of the invention, and it is intended to claim all such changes and modifications that fall within the true scope of the invention as defined and covered by the following claims.

What is claimed is:

1. A cutting and grinding mechanism for breaking up bulk blocks of elastomeric materials for use in making gum base and chewing gum products, said mechanism comprising;

a housing;

a rotary grinding member positioned in said housing;

an inlet chute connected to said housing for introducing elastomeric material into the rotary grinding member;

a feeding and metering mechanism for controlling the introduction of bulk blocks of elastomeric material to said rotary grinding member;

a lubricant feeding mechanism for introducing powdered lubricant into said housing and coating said elastomeric materials;

a water-cooled jacket mechanism for cooling said housing and maintaining the temperature in the housing within a prespecified range; and a screening member for preventing large particles of the ground up elastomeric materials from exiting said housing and only permitted particles of a predetermined size to exit said housing.

2. The cutting and grinding mechanism as set forth in claim 1 further comprising a conveyor member for feeding the bulk blocks of elastomeric materials into said inlet chute.

3. The cutting and grinding mechanism as set forth in claim 1 further comprising a vacuum-conveyor system attached to said housing for removing said ground up elastomeric material from said housing after it has passed through said screening member.

4. A system for preparing an elastomeric material for use in a gum base manufacturing process, the system comprising:
- a cutting and grinding mechanism, said cutting and grinding mechanism having a housing and a cutting member for breaking up said elastomeric material into small pieces;
- a lubricant mechanism positioned adjacent said cutting and grinding mechanism for introducing a powdered lubricant into said grinding mechanism and coating said pieces of material;
- a storage hopper positioned in communication with said cutting and grinding mechanism;
- a first conveying mechanism for transporting said coated pieces of material from said cutting and grinding mechanism to said storage hopper;
- a metering mechanism positioned in communication with said storage hopper for metering quantities of said pieces of material; and
- a second conveying mechanism for transporting said pieces of material from said storage hopper to said metering mechanism.

5. The system as set forth in claim 4 further comprising:
- cooling means in communication with said cutting and grinding mechanism, said conveying mechanism and said storage hopper for cooling said pieces of material to a temperature within a desired temperature range and maintaining said pieces of material within said temperature range.

6. The system as set forth in claim 5 wherein said cooling means includes a cooling jacket positioned on said housing adjacent said cutting and grinding mechanism.

7. The system as set forth in claim 4 further comprising a continuous extruder and wherein said metered quantities of said pieces of material are introduced into said continuous extruder in order to produce a gum base material.

8. The system as set forth in claim 7 wherein said pieces of material are metered and introduced into said continuous extruder on demand in accordance with the operational requirements of said gum base manufacturing process.

9. The system as set forth in claim 4 further comprising a sifter mechanism positioned in said first conveying mechanism, said sifter mechanism sifting out excess powdered lubricant from said pieces of material.

10. The system as set forth in claim 9 further comprising a third conveying mechanism for transporting said sifted out excess powdered lubricant from said sifter mechanism to said lubricant mechanism.

11. The system as set forth in claim 4 further comprising a feeder mechanism positioned adjacent said cutting and grinding mechanism for feeding bulk elastomeric material to said grinding mechanism.

12. The system as set forth in claim 4 wherein said first conveying mechanism is a vacuum-conveying mechanism.

13. The system as set forth in claim 4 wherein said metering mechanism comprises a loss-in-weight feeder.

14. The system as set forth in claim 4 further comprising a magnetic mechanism positioned in said second conveying mechanism for removing metallic impurities from said pieces of material.

15. The system as set forth in claim 4 further comprising load cell means in operative communication with said storage hopper for assisting in metering quantities of said pieces of material.

* * * * *